March 16, 1954
J. A. WEEDMAN
2,672,457
PROCESS FOR THE DECOMPOSITION OF
UREA AND THIOUREA ADDUCTS
Filed June 20, 1950
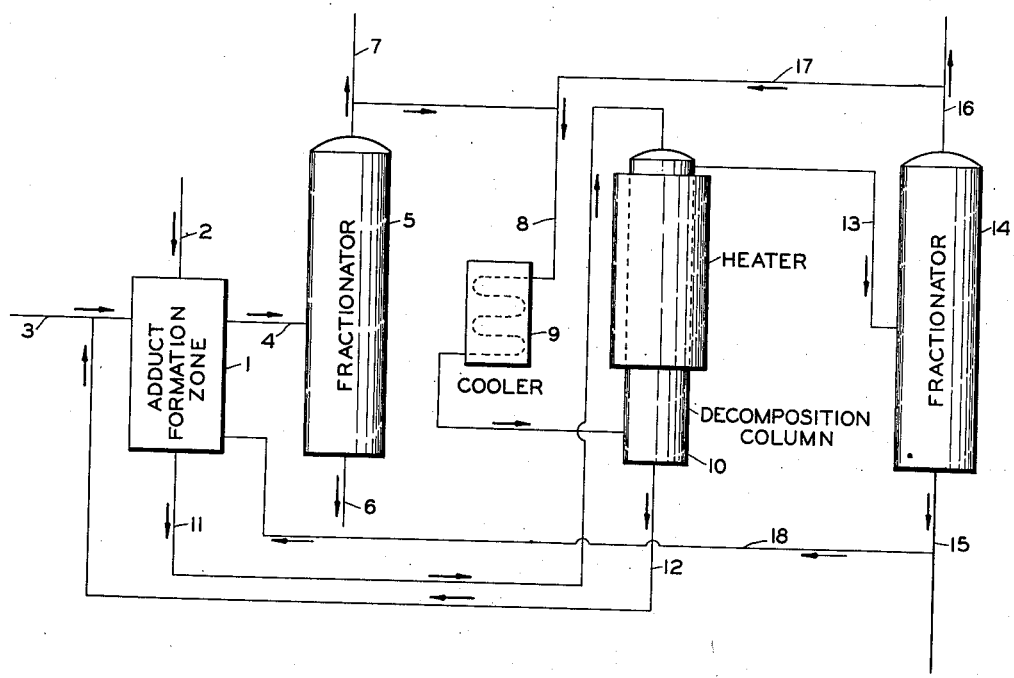
INVENTOR.
J. A. WEEDMAN
BY
ATTORNEYS

Patented Mar. 16, 1954

2,672,457

UNITED STATES PATENT OFFICE

2,672,457

PROCESS FOR THE DECOMPOSITION OF UREA AND THIOUREA ADDUCTS

John A. Weedman, Bartlesville, Okla., assignor to Phillips Petroleum Company, a corporation of Delaware Application June 20, 1950, Serial No. 169,099

9 Claims. (Cl. 260—96.5)

This invention relates to a process for the separation of organic compounds. In one of its aspects, it relates to a process for the separation of a class of compounds characterized by straight carbon atom chains from admixture with another class of organic compounds characterized by branched carbon atom chains by the formation of adducts, either of the former with urea or of the latter with thiourea. In another of its aspects, this invention relates to a process for decomposing the urea and thiourea adducts thus formed.

There are many known processes for the separation of an organic compound from its admixture with other organic compounds. Thus, a compound having a boiling point differing substantially from another compound can be separated therefrom by means of a fractional distillation process. However, compounds having similar boiling points are difficultly separable by such a process. For example, n-octane (B. P. 125.6° C.) cannot be economically separated from 2,2,4-trimethylhexane (B. P. 125.5° C.) because of the small difference in boiling points. Such a separation is often desirable as, for example, in a gasoline manufacturing process in order to improve the octane rating of the gasoline by removal of the low octane straight-chain hydrocarbons therefrom. In another type of separation process, advantage is taken of the degree of unsaturation of the compounds being separated. For example, n-octane can be separated from 3-methyl-2-heptene by polymerization of the 3-methyl-2-heptene to form a higher boiling polymer or by its reaction with another compound, such as bromine or sulfuric acid, to form an intermediate which is then easily separable from the n-octane.

There has recently been discovered a process for the separation of organic compounds which process permits the separation of a class of compounds having one type of molecular arrangement from a class of compounds having a different molecular arrangement. Thus, straight-chain hydrocarbons can be separated, individually or as a class, from branched chain and/or cyclic hydrocarbons independently of the boiling points of the compounds being separated. This process depends upon the peculiar property of urea ($CO(NH_2)_2$) which permits it to form adducts with organic compounds having straight carbon atom chains and yet not to form adducts with branched-chain or cyclic organic compounds. Thus, in such a process, it is possible to separate n-octane from 2,2,4-trimethylhexane, isooctane or other branched-chain hydrocarbons, irrespective of their boiling points. Also, straight-chain hydrocarbons can readily be separated from cyclic hydrocarbons, such as benzene, toluene or the cycloparaffins, irrespective of the boiling points of the various components of the mixture thereof. The adducts thus formed are readily recoverable by filtration or other suitable means from the organic compounds that form no adducts with urea, and then the adducts are dissociated to recover the urea and and the adduct-forming organic compounds. This dissociation is ordinarily carried out by treating the adducts with warm water. The water dissolves the urea, and the adduct-forming organic compounds are separated from the aqueous phase as a separate liquid or solid phase. This procedure, if put to commercial use, would involve the continuous recovery of urea from aqueous solution by a process such as evaporation and/or crystallization. To dry the urea it would be necessary to heat it to an elevated temperature or to subject it to a reduced pressure. However, urea is rather unstable at elevated temperatures, and the use of vacuum drying equipment involves considerable expense. It has also been proposed to dissociate the adducts by thermal decomposition. However, such a procedure also entails the loss of urea at the elevated temperatures, and dry, destructive distillation is frequently difficult to adapt to continuous operation.

While urea forms adducts with organic compounds having straight carbon atom chains, thiourea ($CS(NH_2)_2$) forms adducts with organic compounds having branched carbon atom chains. Thus, the adduct-forming property of thiourea permits a ready separation of such organic compounds from organic compounds having straight carbon atom chains, since the latter do not form adducts with thiourea. However, the problems of dissociating the thiourea adducts are quite similar to the problem of dissociating the urea adducts, and my invention offers a method for surmounting these problems and difficulties.

From this discussion the advantages and desirability of a process for decomposing urea and thiourea adducts that eliminates difficulties encountered in the prior art are readily apparent.

It is an object of this invention to provide a novel process for the separation of organic compounds.

It is another object of this invention to provide a novel process for the separation of organic compounds having a straight chain of carbon atoms from branched-chain and/or cyclic organic compounds by formation of adducts of the former with urea.

It is another object of this invention to provide a novel process for the separation of organic compounds having a branched chain of carbon atoms from straight chain organic compounds by formation of adducts of the former with thiourea.

It is a further object of this invention to provide a novel process for dissociating adducts of urea and straight chain organic compounds.

It is another object of this invention to provide a novel process for dissociating adducts of urea and straight chain saturated and/or unsaturated hydrocarbons.

It is a further object of this invention to provide a novel process for dissociating adducts of thiourea and branched chain organic compounds.

Still a further object of this invention is to provide a novel process for dissociating adducts of thiourea and branched chain saturated and/or unsaturated hydrocarbons.

Further and additional objects of this invention will be readily apparent from the disclosure and discussion hereinbelow.

I have found that adducts of organic compounds and an amide selected from the group consisting of urea and thiourea can be decomposed or dissociated by passing a gravitational mass of said adducts downwardly through a dissociation zone and countercurrent to a liquid hydrocarbon nonreactive with said amide at the conditions in said dissociation zone. Solid amide is withdrawn from a lower portion or the bottom of the dissociation zone ready for the formation of additional adducts, and liquid hydrocarbon and organic compounds resulting from the decomposition of said adducts are withdrawn from an upper portion of said dissociation zone.

I will describe my invention in detail with reference to the accompanying drawing which is a schematic drawing of a preferred method of effecting my invention. Such conventional equipment as valves, pumps, flow control means, temperature and pressure control devices, and the like has not been included in this drawing, but the inclusion of such equipment is believed to be obvious to one skilled in the art. Furthermore, in the accompanying drawing I will describe a process for the separation of hydrocarbon mixtures which includes the decomposition of adducts of urea and straight-chain hydrocarbons. This drawing is employed by way of example, and from the discussion that follows, it will be obvious that my invention can be employed to decompose adducts of other organic compounds and either urea or thiourea.

The organic compounds that form adducts with urea are many and varied, and because of such reactivity any straight-chain organic compound capable of forming a solid adduct with urea can be separated from its admixture with any branched-chain or cyclic organic compound that does not form a solid adduct with urea. In determining whether any particular organic compound will or will not form an adduct with urea, it is necessary merely to admix such compound and urea with agitation and determine whether any crystalline product or adduct has formed. Obviously, such a determination is a matter of mere routine test, and it is well within the skill of the art. However, it has been found that a straight-chain organic compound having a straight aliphatic carbon atom chain containing from five to fifty, preferably at least seven, carbon atoms therein will form adducts with urea in preference to branched-chain or cyclic organic compounds. The straight-chain organic compounds can be unsubstituted hydrocarbons as well as hydrocarbons containing substituent groups, which will be discussed hereinbelow, attached to one of the two end carbon atoms of the carbon chain. Thus, one or more of such straight-chain hydrocarbons as the paraffinic hydrocarbons containing from five to fifty carbon atoms, for example, pentane, hexane, heptane, octane, nonane, decane, undecane, dodecane, tridecane, tetradecane, pentadecane, hexadecane, heptadecane, nonadecane, eicosane, heneicosane, docosane and progressively higher molecular weight straight-chain paraffins up to and including pentacontane; and the straight-chain olefins containing from five to fifty carbon atoms, for example, the hexenes, heptenes, octenes, nonenes, decenes, undecenes, dodecenes, tridecenes, tetradecenes, pentadecenes, hexadecenes, heptadecenes, nonadecenes, eicosenes, heneicosenes, docosenes, and progressively higher molecular weight straight-chain olefins up to and including the pentacontenes, form adducts with urea, and accordingly they can be readily separated from branched-chain or cyclic hydrocarbons that do not form adducts with urea. Similarly, the corresponding diolefinic hydrocarbons of the above-named compounds form adducts with urea provided the hydrocarbon contains an unbranched chain of from five to fifty carbon atoms. Additionally, derivatives of these saturated and unsaturated hydrocarbons form adducts with urea. For example, the hydroxy, the amino (primary, secondary and tertiary), the mercaptan, and the halide derivatives of these hydrocarbons form adducts with urea. Also, various ketone and ester derivatives of these hydrocarbons react similarly. Ordinarily, the various substituent groups set forth above are attached to one of the two end carbon atoms in the unbranched carbon chain of five to fifty carbon atoms. However, when fluoride atoms are attached to the carbon chain, they act similar to a hydrogen atom, and, when attached to any of the carbon atoms in the unbranched chain, they do not inhibit the formation of adducts with urea. The primary characteristic of these organic compounds is the unbranched chain of from five to fifty carbon atoms.

On the other hand, organic compounds containing a branched chain of carbon atoms form adducts with thiourea, and in accordance with this property they are readily separable from organic compounds containing a straight chain of carbon atoms. Thus, with thiourea branched-chain hydrocarbons containing from three to fifty carbon atoms in the straight carbon atom chain portion of the molecule and also having one or more alkyl substituents therein ranging from one to twenty carbon atoms in length, for example, isobutane, isopentane, dimethyl butane, the methyl pentanes, the ethyl pentanes, dimethyl and trimethyl pentane, diethyl pentane, the methyl hexanes, di-, tri- and tetramethyl hexane, the ethyl hexanes, di-, tri-, and tetraethyl hexane, propyl hexane and other alkyl paraffins as well as methyl propene, the methyl butenes, di-, tri-, and tetramethyl butenes, the methyl pentenes, the ethyl pentenes, dimethyl and trimethyl pentenes, diethyl pentene and other branched-chain olefins including the higher molecular weight olefins, for example, the methyl, ethyl, propyl and butyl derivatives of hexadecene, docosene and pentacontene, will form adducts with thiourea. Also, the corresponding branched chain diolefinic hydrocarbons react similarly. Furthermore, these branched chain compounds may have attached, either to the straight chain or the branched chain of carbon atoms, substituent groups as set forth above in the discussion of compounds that form adducts with urea. The primary characteristic of these compounds is the branched chain of carbon atoms.

Various alicyclic-type organic compounds form adducts with thiourea. For example, such compounds as cyclohexane and cyclohexene each forms an adduct with thiourea. Also, menthane has been found to form such adducts, as well as certain oxygenated derivatives of terpenes, such as camphor, borneol and fenchone. It is these adducts, as well as those discussed hereinabove, that are dissociated in accordance with my invention.

The adducts can be formed by contacting of the organic compounds described above with either solid urea or solid thiourea. Usually it is desirable to employ a solvent for the amine which may also be termed an activator. Suitable activators are water and methanol, and other low-boiling oxygenated hydrocarbon derivatives may be used. For example, ethanol, acetone, methyl ethyl ketone, propanol, secondary butyl alcohol, and the like are quite suitable as activators. Also, the nitrogen-containing compounds disclosed in the copending application of Ackerman, Serial No. 155,134, filed April 10, 1950, may be employed as activators for the adduct-forming reaction. In some instances, sufficient solvent is employed to dissolve the amide, and it is preferred that the resulting solution be saturated with amide at the reaction temperature employed, but unsaturated solutions may be used. Alternatively, solid amide can be used with only sufficient solvent to wet the amide but not sufficient to form a separate, filterable, aqueous phase. The temperature at which the adduct-forming reaction is effected is dependent upon the organic compound or compounds employed. In general, the temperature is below the decomposition temperatures of the adducts to be formed and these temperatures are dependent upon the number of carbon atoms in the organic compounds reacting with the amide to form adducts. Usually the temperature is below 175° F., and in most instances room temperature or a temperature of 60 to 80° F. is employed.

Various methods of contacting the amide and the mixture to be resolved can be employed. For example, a solution of amide in an activator may be contacted either concurrently or countercurrently with the mixture to be resolved. Also, a slurry or mixture of amide and amide-activator solution may be passed either concurrently or countercurrently with the mixture to be resolved. Additionally, either a fluidized fixed bed or a moving bed of amide may be used, and the mixture to be resolved is passed into contact therewith.

In order to decompose the adducts thus-formed, I pass the adducts downwardly through an elongated decomposition zone and countercurrent to a stream of liquid hydrocarbon at an elevated temperature suitable for decomposing the adducts. The adducts are in a columnar mass or bed of agglomerated particles, and they move downwardly through the decomposition zone in the form of a moving bed. The hydrocarbon employed does not form an adduct with the amide at the conditions prevailing in the decomposition zone. To decompose adducts of urea and straight-chain organic compounds straight-chain hydrocarbons may be employed provided the decomposition temperature of the adducts of those hydrocarbons and urea is below the temperature in the decomposition zone. For example, n-hexane can be used to decompose adducts of urea and higher boiling hydrocarbons, such as n-octane, n-nonane, n-decane, and the like, if the temperature in the decomposition zone is at least as high as the decomposition temperature of the adducts of urea and n-hexane. Similarly, low-boiling straight-chain hydrocarbons, such as propane, butane, and mixtures thereof, can be used since these hydrocarbons do not form adducts with urea. In the description of the drawing hereinbelow, I will describe the use of n-pentane for the decomposition of adducts of urea and straight-chain hydrocarbons. Also, isoparaffinic hydrocarbons are suitable for the decomposition of urea adducts, and the specific isoparaffinic hydrocarbons named above are illustrative of those that may be used. Also, if desired, cycloparaffinic hydrocarbons, such as cyclopentane, cyclohexane, and the like can be employed to decompose urea adducts.

To decompose adducts of thiourea and branched-chain organic compounds branched-chain hydrocarbons may be employed, provided the decomposition temperature of the adducts of those hydrocarbons and thiourea is below the temperature in the decomposition zone. For example, isohexane can be used to decompose adducts of thiourea and higher boiling hydrocarbons, such as isooctane, isononane, isodecane, and the like, if the temperature in the decomposition zone is at least as high as the decomposition temperature of adducts of thiourea and isohexane. Similarly, straight-chain hydrocarbons, which are exemplified by those straight-chain hydrocarbons named above, can be used to decompose thiourea adducts since those hydrocarbons do not form adducts with thiourea. Also, those cyclic hydrocarbons that do not form adducts with thiourea may also be used.

The hydrocarbon employed to dissociate adducts of either urea or thiourea and organic compounds should be readily separable by fractional distillation or other suitable means from the organic compound of the adduct, and to effect a separation by fractional distillation differing boiling points are required between the liquid hydrocarbon employed and the organic compound of the adduct. For that reason it is usually desirable to employ relatively low-boiling hydrocarbons, such as pentane, butane, propane, and the like to effect the decomposition since those hydrocarbons are readily separable from the organic compound of the adduct after the adduct has been decomposed.

To effect the decomposition of the adduct I introduce the adduct to the upper portion or top of the decomposition zone or column and the liquid hydrocarbon is introduced to the lower portion or bottom of the same column. The adduct and hydrocarbon pass countercurrently, and solid amide is withdrawn from the lower portion of the column. Liquid hydrocarbon and the organic compound from the adduct are withdrawn from the upper portion of the column. The decomposition of the adduct is effected at a temperature above the temperature for the adduct-forming reaction. The decomposition temperature employed is dependent upon the organic compound in the adduct since, in general, the adduct decomposition temperature is dependent upon the number of carbon atoms in or molecular weight of the organic compound in the adduct. For all practical purposes temperatures within the range of 120 to 270° F. are suitable for the decomposition of the adduct.

It is a feature of my invention that the liquid hydrocarbon is introduced to the lower portion of the decomposition zone at a temperature below the adduct decomposition temperature, and it is preferred that the liquid hydrocarbon be at a temperature suitable for the adduct-forming reaction. In the lower portion of the decomposition zone or column the liquid hydrocarbon first contacts the solid amide resulting from the decomposition of the adduct, and consequently the amide is withdrawn from the column at a temperature suitable for reuse in an adduct-forming reaction. This is particularly important since the adduct-forming reaction is exothermic in nature, and in my process it is not necessary to cool the amide after withdrawal from the decomposition column and prior to use in an adduct-forming reaction. The liquid hydrocarbon passes upwardly through the decomposition column, and as it flows it is heated by the downwardly flowing amide. The upper portion of the decomposition column is heated to a temperature within the range of 120 to 270° F. and suitable for the decomposition of the adduct. As a result of this decomposition solid amide passes into the unheated portion of the decomposition column, and liquid hydrocarbon and organic compound from the adduct are withdrawn from the upper portion of the column.

The pressure at which the decomposition of the adduct is effected is such that the hydrocarbon employed in the decomposition step is in the liquid phase. In some instances, atmospheric pressure is suitable, but, when employing relatively low-boiling hydrocarbons, it is necessary to employ superatmospheric pressures.

In the ensuing discussion I will disclose a complete process for the separation of straight-chain paraffinic hydrocarbons from isoparaffinic hydrocarbons by the formation of adducts of urea with the former and the subsequent decomposition of these adducts. This is merely a specific example and a particular manner of effecting my process, but it is not a limitation upon the scope of my invention.

Referring now to the accompanying drawing, a hydrocarbon mixture containing n-pentane and high boiling straight-chain paraffinic hydrocarbons as well as isoparaffinic hydrocarbons is introduced to adduct formation zone 1 via line 2, and urea and methanol are introduced to zone 1 via line 3. The temperature in zone 1 is such that adducts of urea and straight-chain hydrocarbons higher boiling than n-pentane are formed. Unreacted hydrocarbons are withdrawn from zone 1 via line 4 and thus passed to fractionator 5 which is operated in a manner that isoparaffins higher boiling than n-pentane are withdrawn via line 6 as a product of the process. Overhead from fractionator 5 containing n-pentane and any lower boiling isoparaffins is withdrawn via line 7, and any portion thereof not required in further operation of my process is thus separated from the system. It will be understood by those skilled in the art that the operation of fractionator 5 is subject to variation and that various hydrocarbon fractions may be separated therefrom, the important feature being that a fraction comprising n-pentane is obtained for use in my process. A portion of the overhead from fractionator 5 is passed via line 8 and cooler 9 to the lower portion of decomposition column 10. The temperature of the overhead fraction entering column 10 is about the same as the temperature prevailing in zone 1, and thus the temperature of urea withdrawn from the bottom of zone 10 is ready for use in zone 1.

Adducts of urea and straight-chain paraffinic hydrocarbons are withdrawn from zone 1 via line 11 and passed to the top of column 10. The upper portion of column 10 is provided with heating means to provide the necessary heat for decomposing the adduct therein. On the drawing I have shown column 10 as jacketed by a heater through which a suitable heating means, such as hot water, steam, hot liquid hydrocarbon, and the like is passed. However, other methods of heating column 10 may be used. For example, the column may be provided with internal heating coils through which a hot fluid is passed. If desired, the hot n-pentane fraction passing via line 8 may be passed through the external heating jacket or the internal heating coils prior to passage through cooler 9 in order to provide some of the heat required in column 10. Also, if desired, the hot n-pentane passing via line 8 may be passed in heat exchange relationship with the fluid employed to impart the necessary heat to column 10 prior to passage of the n-pentane through cooler 9. In any event, the adduct is decomposed in column 10. Urea cooled by the n-pentane entering column 10 is recycled to zone 1 via line 12 for further use in urea adduct-forming reactions. The n-pentane fraction and straight-chain paraffinic hydrocarbons resulting from decomposition of the adduct are withdrawn from column 10 via line 13 and passed to fractionator 14 from which paraffinic hydrocarbons higher boiling than pentane are withdrawn via line 15 as a product of the process. If desired, a portion of the product passing via line 15 can be returned to zone 1 via line 18 to wash the adduct and thus remove entrained n-pentane and isoparaffinic hydrocarbons. An n-pentane fraction is withdrawn from fractionator 14 via line 16 and any portion or all of said n-pentane fraction is recycled via line 17.

In an alternative method of operating column 10 it is unnecessary to provide means for heating the upper portion of the column either externally or internally. In this aspect of my invention, a portion or all of the n-pentane fraction, after it has cooled urea in the lower portion of column 10, is withdrawn from the column and heated to supply the necessary heat for decomposing adduct in the upper portion of the column. After being heated, the n-pentane fraction is returned to the column. In a further alternative, column 10 can be divided into two separate and smaller columns with adduct passing downwardly through the decmoposition column and urea passing downwardly through the urea cooling column. In that event, the cool n-pentane fraction is passed upwardly through the down-flowing urea in the urea cooling column. Cooled urea is withdrawn from the bottom thereof and thence passed to adduct formation zone 1. The n-pentane fraction is withdrawn from the top of the urea cooling zone, and, after heating to supply the heat required to decompose the adduct, it is introduced to the bottom of the adduct decomposition zone. Hot urea is withdrawn from the bottom of the latter zone and passed to urea cooling zone. Hydrocarbons are then withdrawn from the top of the adduct decomposition zone and treated in the manner already described.

The advantages of my invention are believed to be obvious from the disclosure hereinabove. For example, in column 10 the adduct is decomposed, and the resulting amide and organic compound are separated from each other in the same column. Also, the urea withdrawn from column 10 is at a temperature for reuse in adduct-forming reactions without cooling or crystallization from solvent as is necessary in other methods of adduct decomposition employing water or other urea solvent for adduct decomposition. Actually, the pentane fraction passing via line 6 can be passed directly to column 10 without passing through cooler 9, but in that event it would be necessary to cool the urea issuing from column 10 prior to its use in zone 1. As a practical matter, it is easier and more efficient to handle and cool a liquid than a solid, and in my process I cool the pentane fraction prior to use in column 10.

From the above disclosure other modifications of my invention will be apparent to those skilled in the art without departing from the spirit and scope of my invention.

I claim:

1. The process of decomposing an adduct of a straight-chain paraffinic hydrocarbon and urea which comprises passing a gravitational mass of said adduct downwardly through an elongated vertically disposed decomposition zone, introducing liquid pentane to a lower portion of said decomposition zone, at a temperature within the range of 60 to 80° F., passing said pentane countercurrent to said adduct, heating the upper portion of said decomposition zone to a temperature within the range of 120 to 270° F., withdrawing solid urea from a lower portion of said decomposition zone at a temperature within the range of 60 to 80° F., and withdrawing liquid pentane and paraffinic hydrocarbon resulting from the decomposition of said adduct from an upper portion of said decomposition zone.

2. The process for decomposing an adduct of a branched-chain paraffinic hydrocarbon and thiourea which comprises passing a gravitational mass of said adduct downwardly through an elongated vertically disposed decomposition zone, introducing liquid pentane to a lower portion of said decomposition zone at a temperature within the range of 60 to 80° F., passing said pentane countercurrent to said adduct, heating the upper portion of said decomposition zone to a temperature within the range of 120 to 270° F., withdrawing solid thiourea from a lower portion of said decomposition zone at a temperature within the range of 60 to 80° F., and withdrawing liquid pentane and paraffinic hydrocarbon resulting from the decomposition of said adduct from an upper portion of said decomposition zone.

3. The process for decomposing an adduct of an organic compound and an amide selected from the group consisting of urea and thiourea which comprises passing a mass of said adduct through a decomposition zone; heating at least a portion of said decomposition zone to the decomposition temperature of said adduct; introducing a liquid hydrocarbon into the downstream end of said decomposition zone, with respect to the flow of said adduct, at a temperature above the adduct-forming temperature of said hydrocarbon and said amide so that no adduct is formed therewith and below the adduct-forming temperature of said amide and said organic compound, said liquid hydrocarbon being easily separable by distillation from the organic compound; passing said liquid hydrocarbon countercurrent to said mass of adduct; withdrawing solid amide from the downstream end portion of said decomposition zone at the adduct-forming temperature of said amide and said organic compound; and withdrawing said liquid hydrocarbon and said organic compound resulting from the decomposition of said adduct from the upstream end portion of said decomposition zone with respect to the flow of said adduct at a temperature above the decomposition temperature of said adduct of said amide and said organic compound.

4. The process for decomposing an adduct of an organic compound and an amide selected from the group consisting of urea and thiourea which comprises passing a mass of said adduct through an elongated, upright decomposition zone; heating at least a portion of said decomposition zone to a temperature within the range of 120 to 270° F.; introducing a liquid hydrocarbon easily separable by distillation from the adducted organic compound, non-reactive with urea at a temperature above 60° F. and non-reactive with thiourea at a temperature above 60° F. into the downstream end of said decomposition zone with respect to the flow of said adduct at a temperature within the range of 60 to 80° F.; passing said liquid hydrocarbon countercurrent to said regenerated solid amide and to said adduct thereby cooling regenerated solid amide to an amide-organic compound adduct-forming temperature; withdrawing said solid amide from the downstream portion of said decomposition zone and withdrawing said organic compounds resulting from the decomposition of said adduct from the upstream end portion of said decomposition zone with respect to the flow of said adduct.

5. The process of claim 4 wherein said organic compound is a straight chain hydrocarbon and said amide is urea.

6. The process of claim 4 wherein said organic compound is a straight chain paraffinic hydrocarbon, said amide is urea, and said liquid hydrocarbon comprises essentially normal pentane.

7. The process of claim 4 wherein said organic compound is a branched chain hydrocarbon and said amide is thiourea.

8. The process of claim 7 wherein said liquid hydrocarbon fraction comprises essentially pentane.

9. The process for decomposing an adduct of an organic compound and an amide selected from the group consisting of urea and thiourea which comprises passing a mass of said adduct downwardly through a decomposition zone; introducing a liquid hydrocarbon easily separable by distillation from said adducted organic compound, at a temperature above the adduct forming temperature of said hydrocarbon and urea, and above the adduct forming temperature of said hydrocarbon with thiourea, and at a temperature within the range necessary to form said organic compound adduct, to a lower portion of said decomposition zone thereby cooling regenerated solid amide to the temperature at which said adduct is formed; passing said hydrocarbon countercurrent to said adduct; heating the upper portion of said decomposition zone to a temperature at which said adduct decomposes; withdrawing cooled solid amide at a temperature within the range necessary to form said adduct and withdrawing liquid hydrocarbon and organic compound resulting from the decomposition of said adduct from an upper portion of said decomposition zone.

JOHN A. WEEDMAN.

References Cited in the file of this patent

UNITED STATES PATENTS

| Number | Name | Date |
|---|---|---|
| 2,386,357 | Schulze et al. | Oct. 9, 1945 |
| 2,386,734 | Wolk | Oct. 9, 1945 |
| 2,410,496 | Graff | Nov. 5, 1946 |
| 2,499,820 | Fetterly | Mar. 7, 1950 |
| 2,520,715 | Fetterly | Aug. 29, 1950 |

OTHER REFERENCES

Bengen German patent application B190,197, Bibliography of Scientific and Indus. Reports, vol. 1, No. 4, page 101, PB 1742. (Office of Publication Board, Washington, D. C., February 1, 1946.)